(12) United States Patent
Kawahara et al.

(10) Patent No.: US 9,344,633 B2
(45) Date of Patent: May 17, 2016

(54) IMAGING APPARATUS AND IMAGING PROCESSING METHOD CAPABLE OF CHECKING COMPOSITION IN ADVANCE, AND STORAGE MEDIUM THEREFOR

(71) Applicant: CASIO COMPUTER CO., LTD., Shibuya-ku, Tokyo (JP)

(72) Inventors: Kazuma Kawahara, Akishima (JP); Toshihiko Yoshida, Fussa (JP); Koki Nakamura, Sakado (JP); Kanako Nakano, Kunitachi (JP); Jun Muraki, Hamura (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 84 days.

(21) Appl. No.: 14/021,855

(22) Filed: Sep. 9, 2013

(65) Prior Publication Data

US 2014/0071325 A1     Mar. 13, 2014

(30) Foreign Application Priority Data

Sep. 13, 2012   (JP) ................................. 2012-201560

(51) Int. Cl.
*H04N 5/225*   (2006.01)
*H04N 5/232*   (2006.01)
*G03B 17/40*   (2006.01)

(52) U.S. Cl.
CPC ............ *H04N 5/23293* (2013.01); *G03B 17/40* (2013.01)

(58) Field of Classification Search
CPC ... H04N 1/2133; H04N 5/23293; G03B 17/40
USPC .................................................. 348/333.12
See application file for complete search history.

(56) References Cited

U.S. PATENT DOCUMENTS

| 7,321,391 B2 | 1/2008 | Ishige | |
| 7,916,182 B2 | 3/2011 | Itoh | |
| 2002/0071042 A1* | 6/2002 | Enomoto | 348/222 |
| 2006/0078224 A1* | 4/2006 | Hirosawa | H04N 5/2353 382/284 |
| 2008/0278518 A1* | 11/2008 | Mei | G06T 11/60 345/629 |
| 2009/0244296 A1* | 10/2009 | Petrescu et al. | 348/207.99 |
| 2009/0268058 A1* | 10/2009 | Hwang | H04N 5/232 348/231.99 |
| 2011/0008036 A1* | 1/2011 | Takatsuka | G03B 15/00 396/283 |
| 2011/0102621 A1* | 5/2011 | Kim | 348/222.1 |
| 2012/0050579 A1* | 3/2012 | Hamada | G03B 17/20 348/240.3 |

FOREIGN PATENT DOCUMENTS

| JP | 3700687 B2 | 9/2005 |
| JP | 2008-136035 A | 6/2008 |
| JP | 2010-141609 A | 6/2010 |

* cited by examiner

Primary Examiner — Twyler Haskins
Assistant Examiner — Dwight C Tejano
(74) Attorney, Agent, or Firm — Holtz, Holtz & Volek PC

(57) ABSTRACT

FIG. 2C depicts a live view screen when a movement is made in a direction of approaching the camera position at the time of pre-photographing (frontward direction) and also in the right direction in the drawing. When the camera position is changed, the display state of a provisional subject image in the live view screen is changed according to the change. In this case, the display size of the provisional subject image is changed according to the movement distance of the camera position in the frontward direction and the display position of the provisional subject image is changed in the left direction according to the movement distance in the right direction.

17 Claims, 7 Drawing Sheets

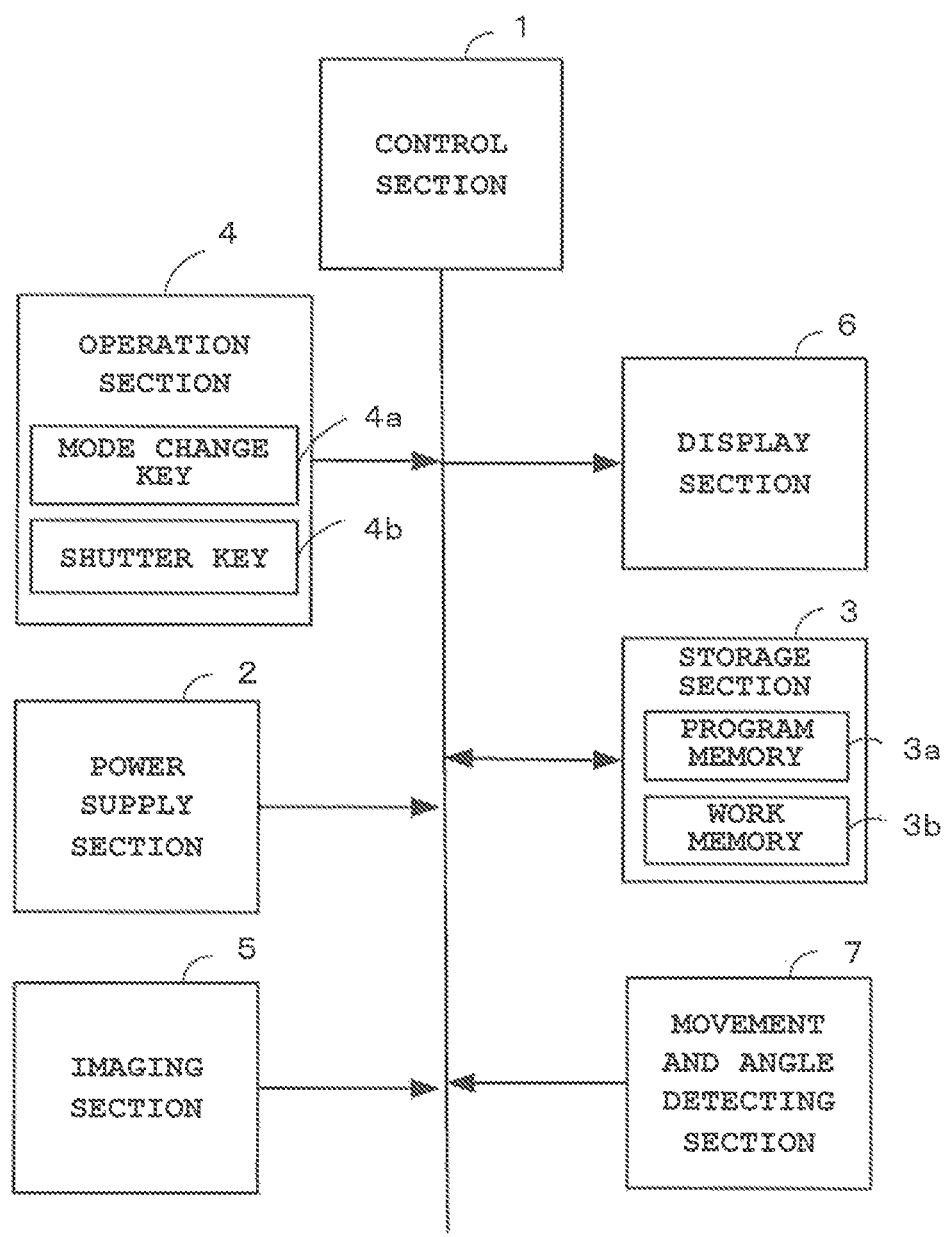

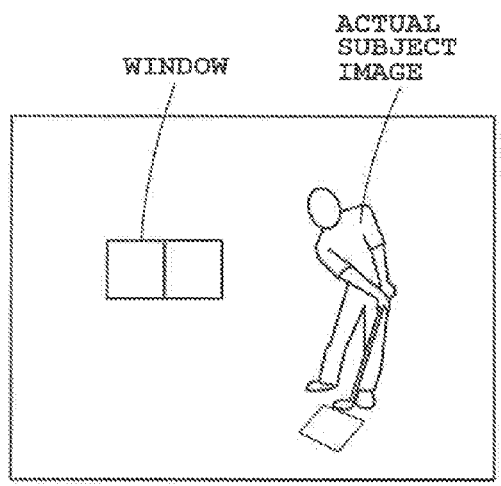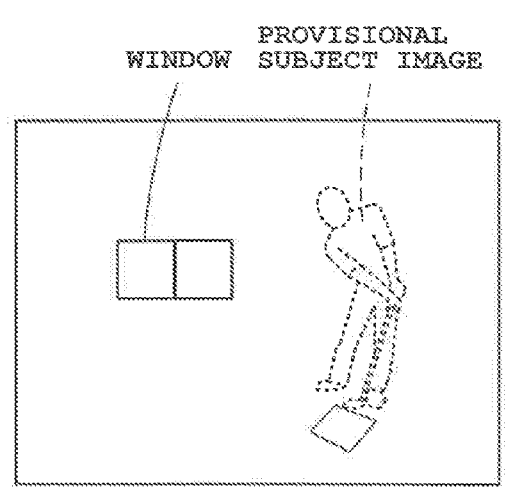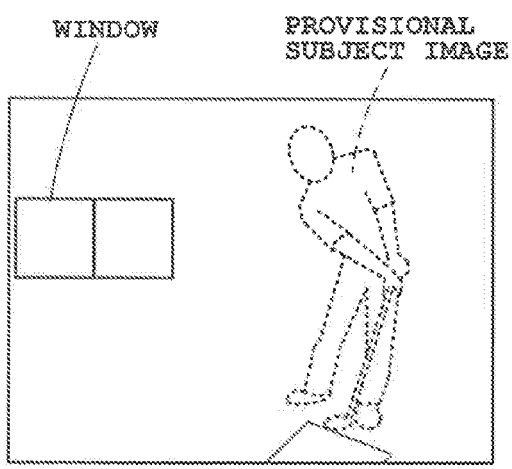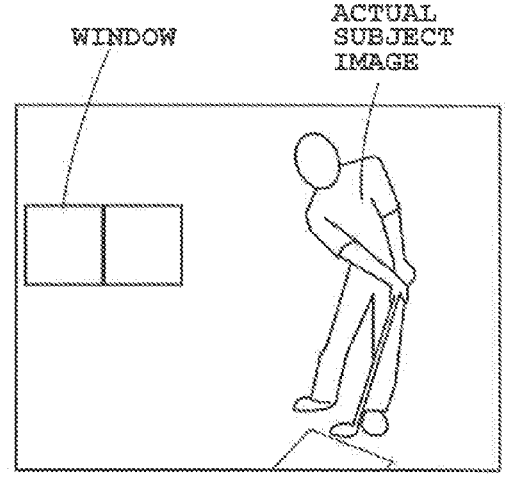

FIG. 5A
FIG. 5D
BEFORE MOVEMENT
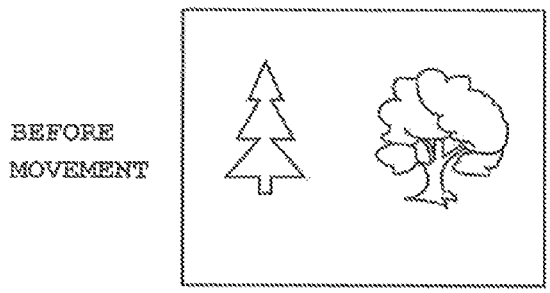
+
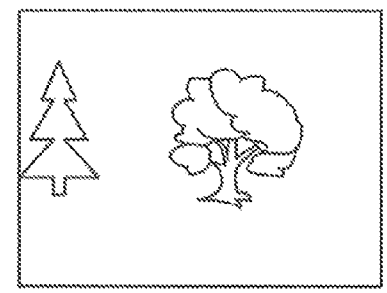
+
FIG. 5B
FIG. 5E
PROVISIONAL SUBJECT IMAGE
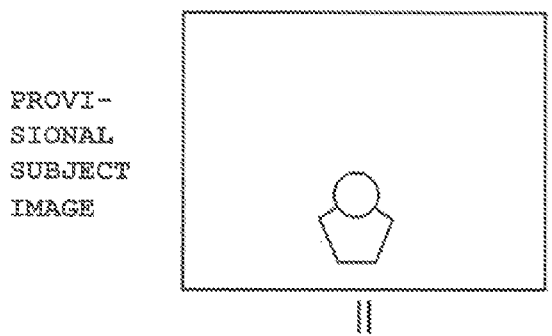
=
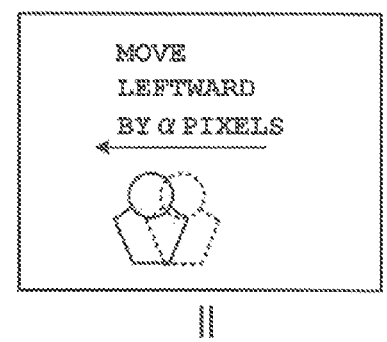
=
FIG. 5C
FIG. 5F
COMPOSITE DISPLAY
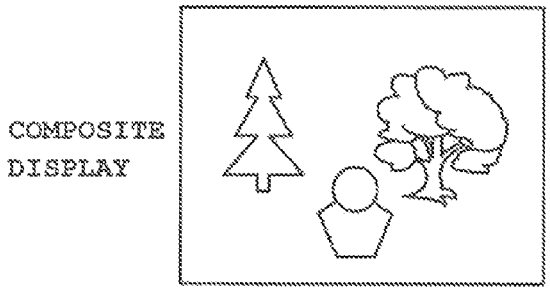
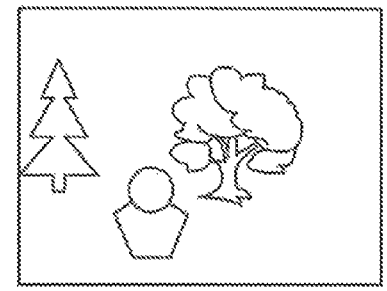
FIG. 5G
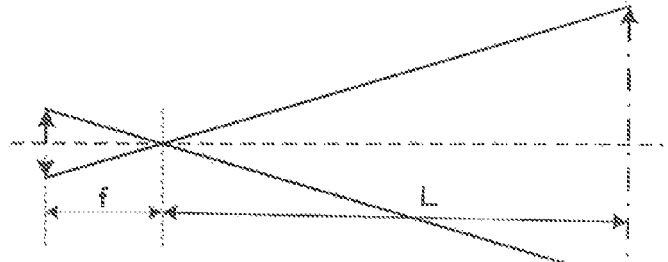
$$\alpha = \frac{A \times f/L}{p}$$

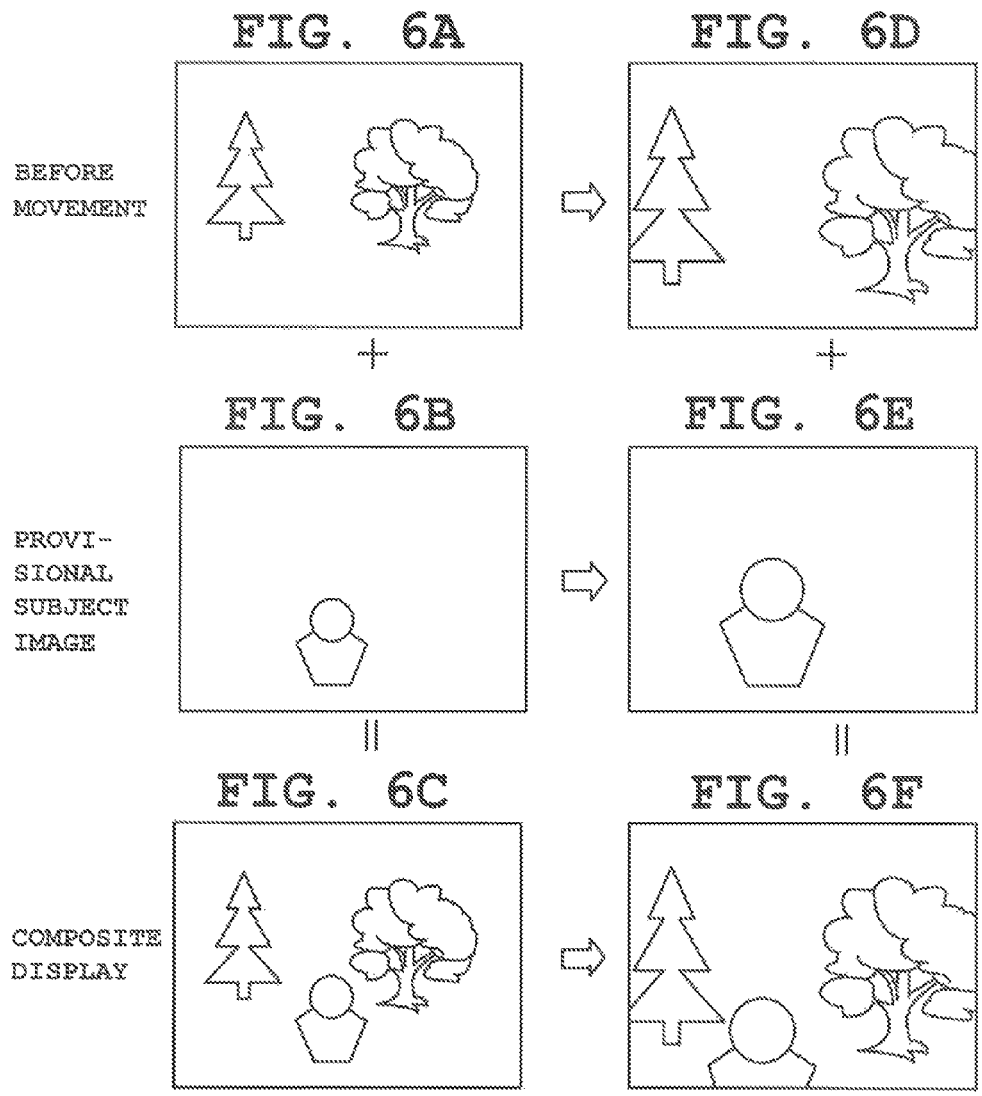
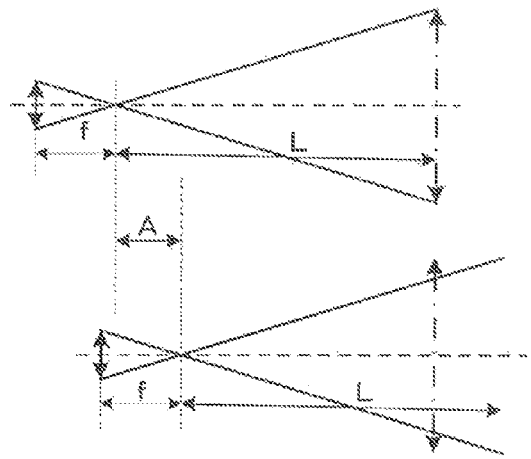
$$\alpha = \frac{f + (A \times f / L)}{f}$$

A=L×tan θ

IMAGING APPARATUS AND IMAGING PROCESSING METHOD CAPABLE OF CHECKING COMPOSITION IN ADVANCE, AND STORAGE MEDIUM THEREFOR

CROSS-REFERENCE TO RELATED APPLICATION

This application is based upon and claims the benefit of priority from the prior Japanese Patent Application No 2012-201560, filed Sep. 13, 2012, the entire contents of which are incorporated herein by reference.

BACKGROUND OF THE INVENTION

1. Field of the Invention

The present invention relates to an imaging apparatus including an imaging section which photographs a subject, an imaging processing method and a storage medium therefor.

2. Description of the Related Art

In general, an imaging apparatus such as a digital still camera or a video camera includes a self-timer photographing function. At the time of photographing by the self-timer photographing function, since the photographer is a subject, framing and the like have to be decided with the subject being out of a photographing range (in a frame-out state), which often serves as a major cause for a failure of photographing.

A conventional technology to prevent the problem described above is disclosed in Japanese Patent Application Laid-Open (Kokai) Publication No. 2008-136035, in which, when a photographer (subject) enters a photographing range (in a frame-in state) after pressing the shutter button at the time of self-timer photographing, and is recognized by a face recognition function, photographing is performed after focusing on the subject (person).

SUMMARY OF THE INVENTION

In accordance with one aspect of the present invention, there is provided an imaging apparatus comprising a an imaging section which photographs a subject; a composite display section which displays, by composite display, a provisional subject image arranged on a predetermined position in a live view screen where an image from the imaging, section is displayed as a live view image; and a display control section which, when at least one of a photographing position, a photographing direction, and a photographing magnification is changed, changes a display state of the provisional subject image in the live view screen according to a change amount.

In accordance with another aspect of the present invention, there is provided an imaging processing method comprising: a step of displaying, by composite display, a provisional subject image arranged on a predetermined position in a live view screen where an image from an imaging section which images a subject is displayed as a live view image; and a step of, when at least one of a photographing position, a photographing direction, and a photographing magnification is changed, changing a display state of the provisional subject image in the live view screen according to a change amount.

In accordance with another aspect of the present invention, there is provided a non-transitory computer-readable storage medium having stored thereon a program that is executable by a computer, the program being executable by the computer to perform functions comprising: processing for displaying, by composite display, a provisional subject image arranged on a predetermined position in a live view screen where an image from an imaging section which images a subject is displayed as a live view image and processing for, when at least one of a photographing position, a photographing direction, and a photographing magnification is changed, changing a display state of the provisional subject image in the live view screen according to a change amount.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a block diagram showing basic components of a digital compact camera to which the present invention has been applied as an imaging apparatus;

FIG. 2A to FIG. 2D are diagrams each depicting an example of image display for describing a characteristic operation (an operation at the time of layer mode switching) of an embodiment;

FIG. 5A to FIG. 5G are diagrams depicting a case where a camera position has been moved in a lateral direction (left direction);

FIG. 6A to FIG. 6G are diagrams depicting a case where a camera position has been moved in a longitudinal direction (frontward direction)

DETAILED DESCRIPTION OF THE PREFERRED EMBODIMENTS

Figure 3:
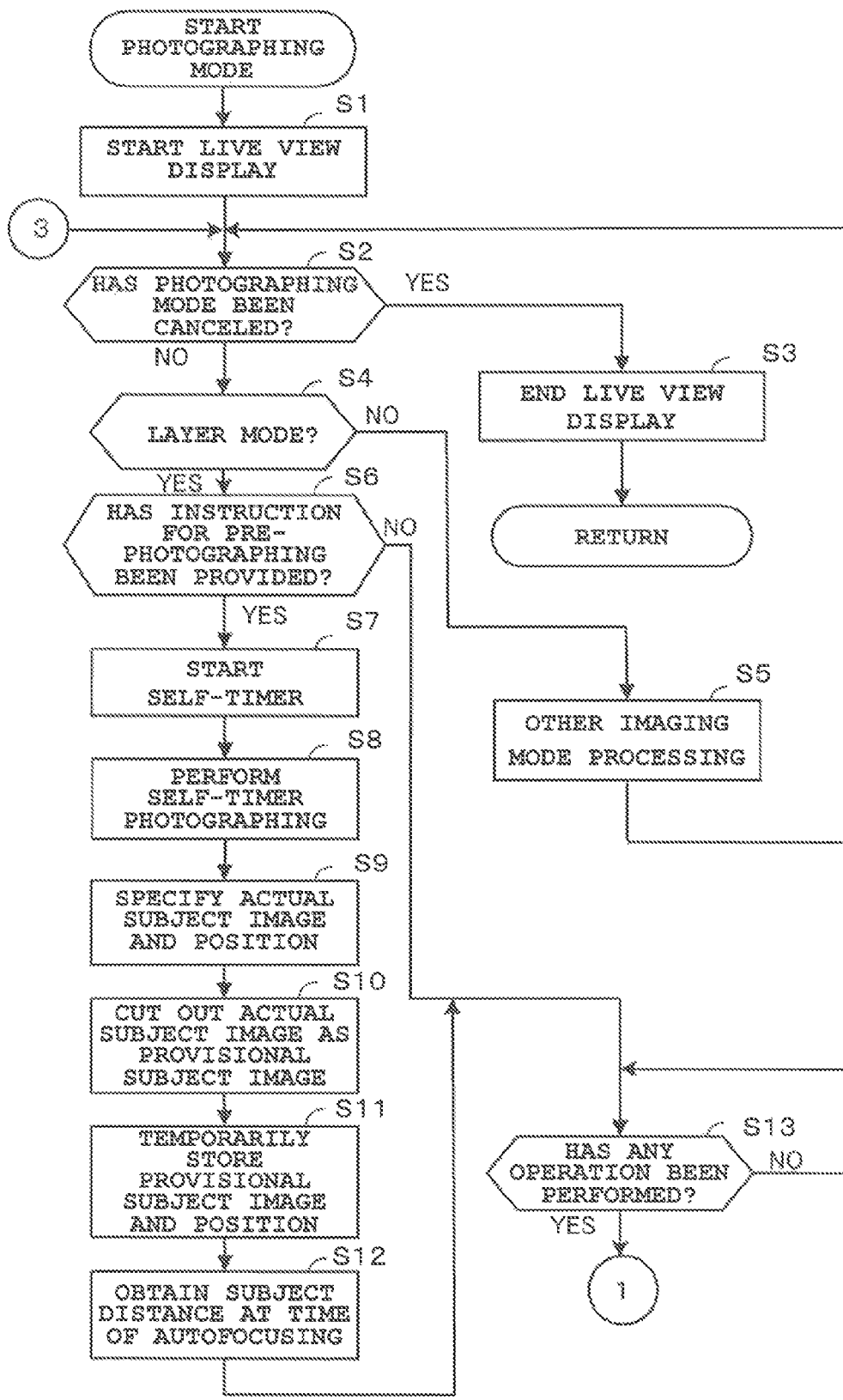
FIG. 3 is a flowchart to be started and performed when a current mode is switched to a photographing mode.

An embodiment of the present invention is described with reference to FIG. 1 to FIG. 7.

In the present embodiment, a case is exemplarily described in which the present invention is applied to a digital compact camera as an imaging apparatus. FIG. 1 is a block diagram showing basic components of the digital compact camera.

The imaging apparatus is a digital compact camera capable of photographing not only still images but also moving images, and includes basic functions such as a photographing function and a timer function as well as a self-timer function for starting photographing after an operation of pressing a shutter button. A control section 1 in FIG. 1 operates upon power supply from a power supply section (a secondary battery) 2 and controls the entire operation of the camera by following various programs in a storage section 3. The control section 1 is provided with a CPU (Central Processing Unit), a memory, and the like not shown.

The storage section 3 is structured to include, for example, a ROM and a flash memory, and has a program memory 3a where a program and various applications for achieving the present embodiment by following an operation procedure depicted in FIG. 3 and FIG. 4, which will be described further below, are stored, and a work memory 3b which temporarily stores various information (for example, a flag and a time measured by a self timer) required for the imaging apparatus to operate. The storage section 3 may be structured to include, for example, a removable portable memory (recording medium) such as an SD (Secure Digital) card or an IC (Integrated Circuit) card, or may be structured to include, although not shown, a storage area on a predetermined server device side in a case where the imaging apparatus is connected to a network via a communication function.

An operation section 4 in FIG. 1 includes push-button-type keys, a mode change key 4a which switches modes including a photographing mode for enabling photographing (for example, a self-timer photographing mode, a continuous photographing mode, and a layer mode described below) and a replay mode for replaying photographed images as well as a shutter key 4b for instructing to start photographing and various keys (omitted in the drawings) for setting photographing conditions such as exposure and shutter speed. In response to an input operation signal outputted corresponding to an operation key from the operation section 4, the control section 1 performs, for example, mode change processing, photographing processing, and photographing condition setting processing.

An imaging section 5 in FIG. 1 constitutes a camera section which can photograph a subject with high definition by a subject image from an optical lens being formed on an image pickup element such as a CCD (Charge-Coupled Device) or CMOS (Complementary Metal Oxide Semiconductor) omitted in the drawings. The imaging section 5 includes a photographing lens (for example, a zoom lens), an image pickup element, a flash lamp, various sensors, an analog processing section, and a digital processing section. The imaging section 5 can photograph not only still images but also moving images image signal obtained by photoelectric conversion (a signal with an analog value) is subject to color separation and gain adjustment for each of RGB color components, and then converted to data with a digital value. Subsequently, the image data obtained by the digital conversion is subjected to color interpolation processing (demosaic processing) for full-color display on a display section 6. In the present embodiment optical zoom function processing, digital zoom function, autofocus processing (AF processing), exposure adjustment processing (AE processing), auto white balance adjustment processing (AWE), image compression processing, image recovery processing, and the like can also be performed.

The display section 6 is, for example, a high-definition liquid-crystal display or an organic EL (Electro Luminescence) display having a screen with an uneven aspect ratio (width:length=4:3), and serves as a monitor screen (live view screen) for displaying a photographed image (live view image) or a replay screen for replaying photographed images. A movement and angle detecting section 7 in FIG. 1 is a sensor section for detecting a change when a photographing position or a photographing direction is changed according to the movement (movement in a lateral or longitudinal direction) of the camera or the change of the camera angle, and is structured by, for example, combining a triaxial accelerator sensor and a triaxial gyro sensor. The control section 1 detects a moving distance in a lateral direction (X axis direction), a moving distance in a longitudinal direction (Y axis direction), and a camera angle on the X axis plane, as a change amount from a predetermined reference position according to a result of output in directions of three axis (an X axis, a Y axis, and a Z axis) from the movement and angle detecting section 7.

FIG. 2A to FIG. 2D are diagrams each depicting an example of image display for describing a characteristic operation (an operation at the time of layer mode switching) of the present embodiment.

Here, "a layer mode", which is a characteristic operation mode of the present embodiment, is one of photographing modes and allows a composition including an actual subject to be checked in advance by simulation display (transparent composite display described below) that is performed on a live view screen on the display section 6 prior to actual photographing (formal photographing) even if the actual subject is out of a photographing range. That is, in order to allow the composition including the subject to be checked even when the actual subject (photographer) is out of the photographing range (in a frame-out state), in the present embodiment an image generated by cutting out a subject portion (actual subject image) from an image obtained by photographing the actual subject into a human shape is prepared as a provisional subject image (whole-body image), and the provisional subject image is arranged on a live view screen for composite display.

FIG. 2A depicts a live view screen when a photographer (actual subject) uses self-timer photographing in the above-described layer mode to provisionally photograph (pre-photograph) the state of performing a golf swing indoors by himself or herself. The drawing exemplarily depicts the state where the actual subject image has been photographed on the right side with respect to windows photographed on the left side. Upon such provisional photographing (pre-photographing), the control section 1 cuts out the actual subject image (for example, a whole-body image) from the photographed image to generate a provisional subject image of the same shape. FIG. 2B and FIG. 2C each depict a live view screen when the photographer (the actual subject) has moved out of frame to check how he or she has been photographed.

FIG. 2B depicts a live view screen when the photographer has moved out of frame without changing the camera position, the camera angle, and zoom magnification at the time of the pre-photographing. In the live view screen, the provisional subject image generated at the time of the pre-photographing is combined and displayed as it is. The provisional subject image in the live view screen has the same display position and display size as those of the actual subject image at the time of the pre-photographing. Therefore, in the live view screen of FIG. 2B, the provisional subject image is combined and placed as it is in place of the actual subject image in the live view screen of FIG. 2A. In this case, the provisional subject image is displayed as transparent composite display so as to be viewable in the live view screen (for example, composite display in a translucent manner). When it is judged that the provisional subject image is not favorable as a result of checking the live view screen of FIG. 2A, in order to change at least one of the camera position, the camera angle, and the zoom magnification at the time of the pre-photographing, the photographer moves the camera in a lateral or longitudinal direction, changes the camera angle, or changes the zoom magnification.

FIG. 2C depicts a live view screen when the photographer out of frame has changed at least one of the camera position, the camera angle, and the zoom magnification at the time of the pre-photographing. Here, the drawing depicts an example of the live view screen when a movement is made in a direction of approaching the camera position at the time of the pre-photographing (frontward direction) and also in the right direction in the drawing. When the camera position is changed as described above, the control section 1 changes the display state of the provisional subject image in the live view screen according to the change in the camera position. Here, as the change of the display state of the provisional subject image, at least one of the display size and the display position is changed. In the example depicted in the drawing, the display size of the provisional subject image has been changed according to the movement distance of the camera position in the frontward direction, and also the display position of the provisional subject image has been changed in the left direction according to the movement distance in the right direction.

FIG. 2D depicts a photographed image obtained by actual photographing (formal photographing). Here, when it is judged that the provisional subject image is favorable as a result of checking the live view screen of FIG. 2C, the photographer instructs to perform actual photographing (formal photographing) by self-timer photographing, and than enters the photographing range for frame-in. Here, the photographer returns to a position at the time of the pre-photographing (original position) to make the same pose (the pose of performing a golf swing) as that at the time of the pre-photographing. In this state, actual photographing by self-timer photographing is performed, and thereby a photographed image as depicted in FIG. 2D is obtained. Then, the photographed image obtained as described above by the actual photographing is subject to compression processing and the like and is then recorded and stored.

Next, the operation concept of the digital compact camera in the present embodiment is described with reference to a flowchart depicted in FIG. 3 and FIG. 4. Here, each function described in this flowchart is stored in the form of readable program code, and operations according to the program code are sequentially performed. Also, operations according to the program code transmitted via a transmission medium such as a network can be sequentially performed. That is, an operation unique to the present embodiment can be performed by using a program/data externally supplied via a transmission medium. The flowchart in FIG. 3 and FIG. 4 outlines the operation of a characteristic portion of the present embodiment from among all of the operations of the camera. After exiting the flow of FIG. 3 and FIG. 4, the control section 1 returns to the main flow (not shown) of the entire operation.

Figure 4:
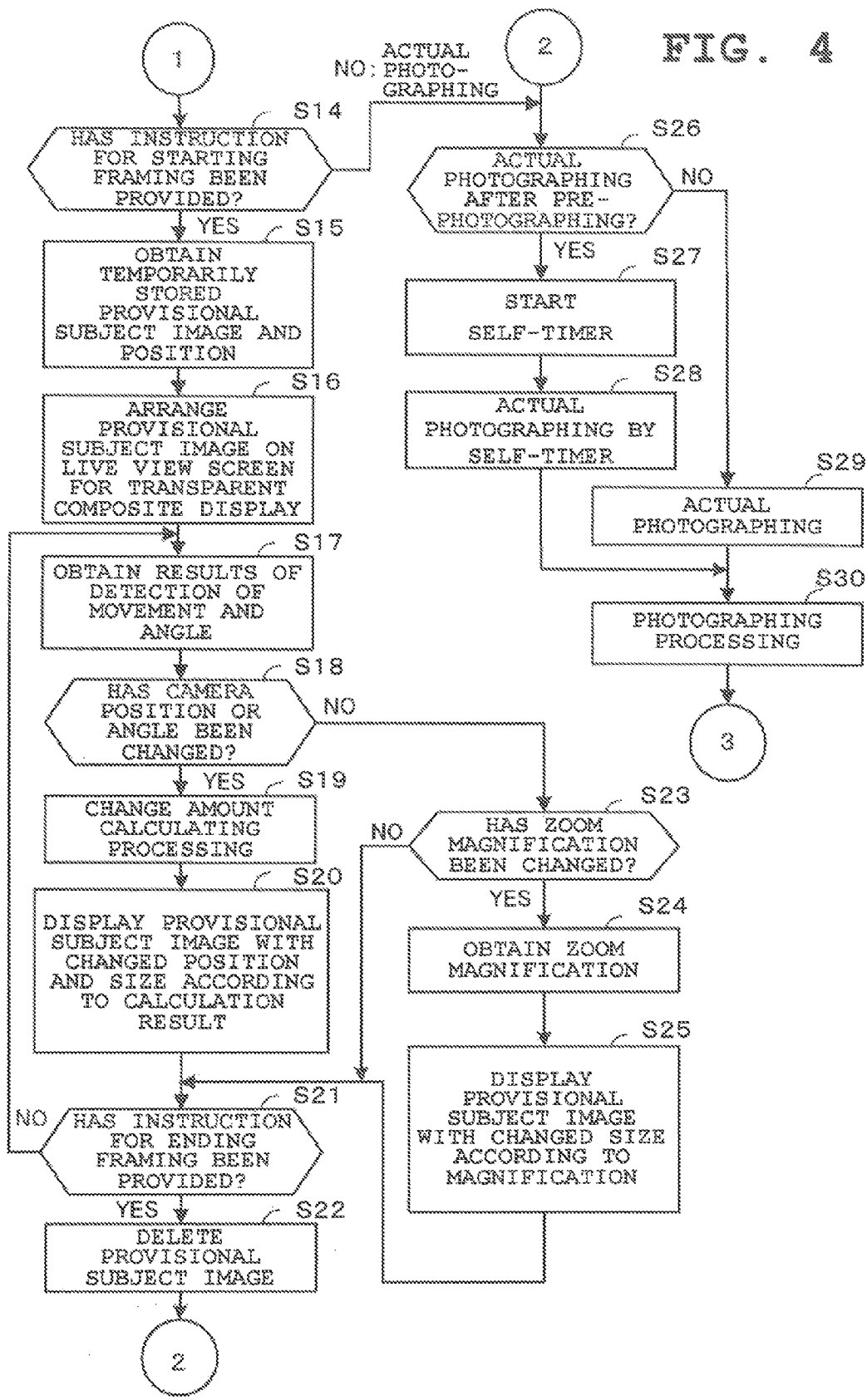
FIG. 4 is the flowchart following the operation of FIG. 3.

The flowchart in FIG. 3 and FIG. 4 is started when a current mode is switched to a photographing mode by the mode change key 4a.

First, the control section 1 starts live view display by obtaining an image from the imaging section 5 for display on a live view screen (Step S1 of FIG. 3), and then judges whether an operation for cancelling the photographing mode has been performed (Step S2). Here, when the photographing mode has not been cancelled (NO at Step S2), the control section 1 judges whether the current mode has been changed to the layer mode by the mode change key 4a (Step S4). Here, when the current mode has been changed to another photographing mode other than the layer mode, for example, a self-timer photographing mode or a continuous photographing (NO at Step S4), relevant photographing processing is performed accordingly (Step S5), and then the control section 1 returns to Step S2. When an operation of cancelling the photographing mode has been performed (YES at Step S2), the control section 1 deletes the live view screen (Step S3), and then exits the flow of FIG. 3 and FIG. 4.

When the current mode has been switched to the layer mode (YES at Step S4), the control section 1 judges whether a key for making an instruction for pre-photographing (provisional photographing) (for example, a pre-photographing key not shown) has been operated (Step S6). When an instruction for pre-photographing has been made by the photographer (YES at Step S6), the control section 1 starts a timer measuring operation for self-timer photographing (Step S7). The photographer goes in the frame after making an instruction for pre-photographing and, for example, performs a golf swing as depicted in FIG. 2A. In this state, when the timer reaches time out, the control section 1 instructs the imaging section 5 to perform pre-photographing to obtain a photographed image at that time (Step S8).

When pre-photographing is performed, the control section 1 analyzes the photographed image to specify the actual subject image (a whole-body image of the photographer) from the photographed image and also specify the position of the actual subject image (Step S9). In this case, a human shape (for example, a whole-body image) is specified and also an attachment worn by the actual subject (for example, a golf club in FIG. 2A) is specified by image recognition. Then, by cutting out the specified actual subject image from the photographed image as a provisional subject image, the control section 1 generates the provisional subject image (Step S10). This recognition technology can be achieved by using a known technology, and therefore is not described herein. Subsequently, the control section 1 temporarily stores the provisional subject image and its position in the work memory 3b (Step S11), acquires the subject distance at the time of the autofocus processing in the pre-photographing, and temporarily stores it in the work memory 3b (Step S12). Then, while judging whether any operation has been performed (Step S13) the control section 1 waits for operation.

Here, in the layer mode (YES at Step S4), when a pre-photographing instruction has not been made (NO at Step S6) but another operation has been performed (YES at Step S13), the control section 1 proceeds to the flow of FIG. 4 and judges whether a key for making an instruction for starting framing (for example, a framing key not shown) has been operated (Step S14). Here, when the photographer moves out of frame and instructs to start framing to check how he or she has been photographed (YES at Step S14), the control section 1 reads and obtains the provisional subject image and its position temporarily stored at the time of the pre-photographing (Step S15), and causes the provisional subject image to be arranged at the relevant position on the live view screen for transparent composite display (for example, translucent composite display) (Step S16). Accordingly, transparent display of the provisional subject image with a golf swing is made in the live view screen as depicted in FIG. 2B. Therefore, the photographer checks how he or she has been photographed and changes framing as required. In this case, in order to change at least one of the camera position, the camera angle, and the zoom magnification at the time of the pre-photographing, the photographer changes the framing by moving the camera in the lateral or longitudinal direction, changing the camera angle, etc.

Here, the control section 1 obtains output results regarding directions of three axes (an X axis, a Y axis, and a Z axis) from the movement and angle detecting section 7 (Step S17), judges whether the photographing position or the angle has been changed with reference to those at the time of the pre-photographing (Step S18), and judges whether the zoom magnification has been changed (Step S23). That is, the control section 1 judges whether the framing has been changed. When the framing has not been changed (NO at Step S18 and Step S23), the control section 1 judges whether a key for making an instruction for ending the framing has been operated (Step S21). Hereafter, until an instruction for ending the framing is made, the control section 1 repeatedly returns to Step S17 (NO at Step S21), and judges similarly whether the framing has been changed. Then, when judged that the photographing position or the angle has been changed (YES at Step S18), the control section 1 performs processing for calculating its change amount (Step S19), and then performs processing for changing the position and the size of the provisional subject image for transparent composite display on the live view screen, according to a result of the calculation (Step S20).

FIG. 5A to FIG. 5G, FIG. 6A to FIG. 6G, and FIG. 7 are diagrams for describing how to calculate a change amount when the photographing position or the camera angle is changed.

FIG. 5A to FIG. 5G shows the case where the camera position has been moved in a lateral direction (left direction), and FIG. 5A to FIG. 5C each depict a live view screen before the camera position is moved in the left direction. FIG. 5A depicts a live view screen when the actual subject (photographer) is out of frame after photographing a background (for example, two trees), and FIG. 5B depicts a provisional subject image for transparent composite display in the live view screen. FIG. 5C is a diagram depicting the state where the provisional subject image of FIG. 5B has been subjected to transparent composite display in the live view screen in FIG. 5A.

FIG. 5D to FIG. 5F each depict a live view screen after the camera position is moved in the left direction. FIG. 5D depicts a live view screen when the camera position has been moved in the left direction from the state of FIG. 5A where the actual subject is out of frame. FIG. 5E depicts a provisional subject image for transparent composite display in the live view screen, in which the provisional subject image has been moved in the left direction by a pixels on the screen. FIG. 5F is a diagram depicting the state where the provisional subject image of FIG. 5E has been subjected to transparent composite display in the live view screen in FIG. 5D.

FIG. 5G depicts a computational expression and an optical path diagram for converting a camera movement distance to the number of pixels on the screen. In the drawing, "L" is a distance (a value obtained by autofocus measurement) to the actual subject before movement, and "f" is a focal length of a lens. Here, given that the distance by which the camera position has been actually moved is "A", a movement distance on an image pickup device such as a CCD is "α", and the size per pixel on the screen is "p", the movement distance a on the image pickup device is found by the following equation:

$$\alpha(A \times f/L)/p.$$

By performing translation of the provisional subject image on the screen by α pixels in the left direction for transparent composite display, the live view screen enters a state depicted in FIG. 5F.

FIG. 6A to FIG. 6G show the case where the camera position has been moved in a longitudinal direction (frontward direction), and FIG. 6A to FIG. 6C each depict a live view screen before the camera position is moved in the frontward direction with the actual subject (the photographer) being out of frame. As with FIG. 5A, FIG. 6A depicts a live view screen when the actual subject (photographer) is out of frame after photographing a background. FIG. 6B depicts a provisional subject image for transparent composite display in the live view screen. FIG. 6C is a diagram depicting the state where the provisional subject image of FIG. 6B has been subjected to transparent composite display in the live view screen in FIG. 6A. FIG. 6D to FIG. 6F each depict a live view screen after the camera position is moved in the frontward direction. FIG. 6D depicts a live view screen when the camera position is moved in the frontward direction from the state of FIG. 6A where the actual subject is out of frame. FIG. 6E depicts a provisional subject image for transparent composite display in the live view screen. FIG. 6F is a diagram depicting the state where the provisional subject image of FIG. 6E has been subjected to transparent composite display in the live view screen in FIG. 6D.

FIG. 6G depicts a computational expression and an optical path diagram for converting a camera movement distance to a magnification on the screen. In the drawing, "L" a distance (a value obtained by autofocus measurement) to the actual subject before movement, and "f" is a focal length of a lens. Here, given that the distance by which the camera position has been actually moved is "A" and a movement magnification on an image pickup device such as a CCD is "α", the movement magnification a on the image pickup device is found by the following equation:

$$\alpha = (f + (A \times f/L))/f.$$

By magnifying the provisional subject image by a on the screen for transparent composite display, the live view screen enters a state depicted in FIG. 6F.

Figure 7:
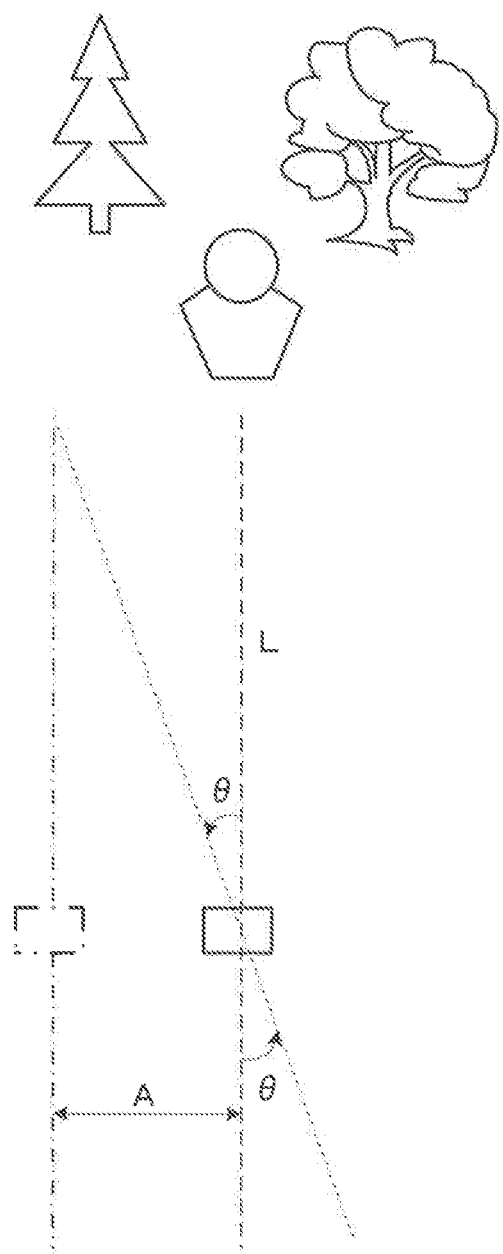
FIG. 7 is a diagram depicting a case where a camera has been rotated to change the angle.

FIG. 7 is a diagram depicting a case where the camera has been rotated to change the angle.

In the present embodiment, when the rotation of the camera is detected according to an output (an angular velocity) of the movement and angle detecting section 7, an angle change amount (rotation angle) with the center position of the lens being taken as an origin point is found, and the change amount is converted to a translational movement distance to determine a pseudo position where the provisional subject image is to be combined. In the drawing, given that "L" is a distance (a value obtained by autofocus measurement) to the actual subject before movement, the distance by which the camera has been actually moved is "A", and the rotation angle of the camera is "θ", the camera movement distance A is found by the following equation:

$$A = L \times \tan \theta.$$

Accordingly, since this is equivalent to the case where the camera has made a translational movement by the distance A in the left direction, the case of the translational movement depicted in FIG. 5A to FIG. 5G is applied similarly thereafter.

When the change amount of the photographing position or angle is calculated as described above and processing for changing the position and the size of the provisional subject image according to the calculation result is performed (Step S17 to Step S20), the control section 1 returns to Step S17 described above until an instruction for ending the framing is provided (NO at Step S21). Therefore, the photographing position or the angle is continuously changed. By following this, the processing for changing the position and the size of the provisional subject image is continuously performed. On the other hand, when the zoom magnification in the optical zoom function or the digital zoom function is changed according to an operation of changing the zoom magnification (YES at Step S23), the zoom magnification is obtained as the above-described α value (Step S24), and the provisional subject image is magnified (enlarged/reduced) by a for transparent composite display in the live view screen (Step S25). Then, the control section 1 returns to Step S17 described above until an instruction for ending the framing is provided (NO at Step S21).

Here, when an instruction for ending the framing is provided (YES at Step S21), the control section 1 deletes the provisional subject image from the live view screen (Step S22), and then proceeds to actual photographing processing, which will be described further below. On the other hand, in the layer mode (YES at Step S4 of FIG. 3), when a pre-photographing instruction has not been made (NO at Step S6) but another operation has been performed (YES at Step S13), if this operation is not an operation for instructing to start framing (NO at Step S14), the control section 1 judges that this operation is an operation for instructing to perform actual photographing and proceeds to Step S26 for actual photographing processing.

First, the control section 1 judges whether this actual photographing is photographing after pre-photographing described above (Step S26). Although omitted in the drawings, if "a pre-photographing-done flag" is turned ON after pre-photographing, it is possible to judge whether actual photographing is photographing after pre-photographing based on whether the pre-photographing-done flag is ON. When judged that this actual photographing is not photographing after pre-photographing (NO at Step S26), the control section 1 judges that normal photographing by the photographer pressing the shutter key 4b has been performed, instructs the imaging section 5 to perform actual photographing, and obtains the photographed image at the time of pressing the shutter button (Step S29). Then, the control section 1 performs photographing processing for recording and storing the photographed image by image compression or the like (Step S30), and returns to Step S2 of FIG. 3.

When judged that this actual photographing is photographing after pre-photographing (YES at Step S26), the control section 1 causes a timer for self-timer photographing to start a measuring operation (Step S27). Here, after making an instruction for actual photographing, the photographer moves into frame again. At this time, the photographer returns to the position at the time of the pre-photographing and makes a similar pose (golf swing). In this state, when the timer reaches time out, the control section 1 instructs the imaging section 5 to perform actual photographing and obtains the photographed image at that time (Step S28). Then, the control section 1 performs photographing processing for recording and storing the photographed image by image compression or the like (Step S30), and returns to Step S2 of FIG. 3.

As described above, in the present embodiment, the control section 1 specifies the position of an actual subject image actually appeared in a photographed image obtained by provisional photographing (pre-photographing) by the imaging section 5, and arranges a provisional subject image representing the actual subject image on the specified position in the live view screen for composite display. In this state, if the photographing position or the photographing direction has been changed with reference to those at the time of the pre-photographing, the display state of the provisional subject image in the live view screen is changed according to the change amount. Therefore, even if the subject is out of the photographing range, the photographer can check a composition including the subject prior to photographing, whereby desired photographing can be precisely performed.

Also, when changing the display state of the provisional subject image according to the change amount of the photographing position or the photographing direction, the control section 1 changes at least one of the display size or the display position. Therefore, a composition including the actual subject can be previously checked according to the change of the display size or the display position of the provisional subject image.

Moreover, the control section 1 detects the change amount by which the photographing position or the photographing direction has been changed, according to the movement of the camera or the change in angle from the output result from the movement and angle detecting section 7, and changes the display state of the provisional subject image in the live view screen according to the change amount. Therefore, the movement of the camera or the change in angle can be accurately detected by the movement and angle detecting section 7 and, by following the change, the display state of the provisional subject image can also be precisely changed.

Furthermore, a value obtained by measuring a distance to the actual subject before the camera is moved, a value obtained by measuring a movement distance of the camera in a lateral direction, and a movement distance (the number of pixels) of the provisional subject image in the lateral direction on the live view screen according to the focal length of the lens are calculated and, according to the movement distance, the provisional subject image on the live view screen is moved for display, and thereby the display position of the provisional subject image is changed. Therefore, the display position of the provisional subject image can be easily and precisely changed.

Still further, a value obtained by measuring a distance to the actual subject before the camera is moved, a value obtained by measuring a movement distance of the camera in a longitudinal direction, and a movement magnification of the provisional subject image on the live view screen according to the focal length of the lens are calculated and, according to the movement magnification, the display size of the provisional subject image on the live view screen is changed. Therefore, the display size of the provisional subject image can be easily and precisely changed.

Yet still further, a value obtained by measuring a distance to the actual subject before the camera, is moved and a movement distance of the provisional subject image in the lateral direction on the live view screen according to a value obtained by measuring an angle with reference to an optical axis of the camera are calculated and, according to the movement distance, the provisional subject image on the live view screen is moved in the lateral direction for display, and thereby the display position of the provisional subject image is changed. Therefore, the display position of the provisional subject image can be easily and precisely changed.

Yet still further, according to the operation of changing the zoom magnification in the optical zoom function or the digital zoom function, the display size of the provisional subject image in the live view screen is changed (magnified/reduced). Therefore, the display size of the provisional subject image can be easily and precisely changed by following the operation of changing the zoom magnification.

Yet still further, self-timer photographing is performed as pre-photographing. Therefore, the photographer himself or herself can become an actual subject.

Yet still further, by cutting out an actual subject image from the photographed image obtained by pre-photographing, the provisional subject image is generated for composite display in the live view screen. Therefore, an actual subject (actual subject image) can be used as a provisional subject image.

Yet still further, the provisional subject image is subjected to transparent composite display in the live view screen. Therefore, the background of live view display can be checked through the provisional subject image.

Yet still further, self-timer photographing is performed as actual photographing after pre-photographing. Therefore, the photographer can perform actual photographing by returning to the photographing position at the time of pre-photographing.

In the above-described embodiment, the provisional subject image is generated by cutting out the actual subject image from the photographed image obtained by pre-photographing, however, an illustrated image whole-body image) or the like of a model (a human shape) modeled after the actual subject may be prepared in advance as a provisional subject image. Also, the provisional subject image may be not an image modeled after the actual subject but a simple human image (an illustrated image). As such, by using an illustrated image or the like as a provisional subject image, it is not necessary to generate a provisional subject image, and the same provisional subject image can be always used. The provisional subject image is not limited to a whole-body image but can be an image above the chest or a face image.

Also, when changing framing, the photographer may change the camera position (move in the lateral or longitudinal direction), the camera angle, and the zoom magnification all at once.

Moreover, in the above-described embodiment, the angle change amount (rotation angle) with the center position of the lens being taken as an origin point is found, and the change amount is converted to a translational movement distance to determine a pseudo position where the provisional subject image is to be combined. However, the orientation of the provisional subject image may be changed according to the angle change amount. In this case, the orientation of the image may be changed according to the angle change amount by, for example, preparing a plurality of pre-photographed images with varied viewpoints such as sideward orientation, frontward orientation, and diagonal orientation, and estimating a three-dimensional image from the images of the plurality of viewpoints.

Furthermore, in the above-described embodiment, the present invention is applied to self timer photographing, However, the present invention is not limited thereto, and can be applied to the case where the composition including the subject is checked with the use of composite display of the provisional subject image by using a time period until the person moves into the frame.

Still further, in the above-described embodiment the present invention is applied to a digital compact camera. However, the present invention is not limited thereto. The present invention may be applied to a digital single-lens reflex camera; a camera-function-equipped personal computer. PDA (Personal Digital Assistant), music player, or electronic game; a tablet terminal; or the like.

Yet still further, the "apparatus" or the "sections" described in the above-described embodiment are not required to be in a single housing and may be separated into a plurality of housings by function. In addition, the steps in the above-described flowchart are not required to be processed in time-series, and may be processed in parallel, or individually and independently.

While the present invention has been described with reference to the preferred embodiments it is intended that the invention be not limited by any of the details of the description therein but includes all the embodiments which fall within the scope of the appended claims.

The invention claimed is:

1. An imaging apparatus comprising:
an imaging section which photographs a subject;
a composite display section which displays, by composite display, a provisional subject image that is not present in an image from the imaging section such that the provisional subject image is arranged on a predetermined position in a live view screen where the image from the imaging section is displayed as a live view image;
a display control section which, when at least one of a photographing position, a photographing direction, and a photographing magnification is changed in a state where the provisional subject image is displayed by the composite display by the composite display section, changes a display state of the provisional subject image in the live view screen according to a change amount of the at least one of the photographing position, the photographing direction, and the photographing magnification, in response to a change of the live view image; and
a specifying section which specifies a position at which an actual subject image actually appears in a photographed image obtained by provisional photographing by the imaging section before the composite display by the composite display section;
wherein the composite display section arranges, as the provisional subject image that is not present in the image from the imaging section, an image corresponding to the actual subject image at the position specified by the specifying section in the live view screen; and
wherein the display control section changes the display state of the provisional subject image in the live view screen according to the change amount when at least one of the photographing position, the photographing direction, and the photographing magnification is changed, with reference to the photographing position, the photographing direction, and the photographing magnification at a time of the provisional photographing.

2. The imaging apparatus according to claim 1, wherein the display control section changes at least one of a display size and a display position, when changing the display state of the provisional subject image according to the change amount of one of the photographing position, the photographing direction, and the photographing magnification.

3. The imaging apparatus according to claim 1, wherein the specifying section further specifies, in addition to the position, a size of the actual subject image actually appeared in the photographed image obtained by the provisional photographing by the imaging section, and
wherein the composite display section arranges the provisional subject image representing the size of the actual subject image on the position specified by the specifying section in the live view screen.

4. The imaging apparatus according to claim 1, further comprising:
a detecting section which detects a change amount when the photographing position or the photographing direction is changed according to a movement or an angle change of the imaging apparatus, with reference to the photographing position or the photographing direction at the time of the provisional photographing,
wherein the display control section changes the display state of the provisional subject image in the live view screen according to the change amount detected by the detecting section.

5. The imaging apparatus according to claim 4, further comprising:
a subject distance specifying section which specifies a distance to an actual subject before the imaging apparatus is moved,
wherein the display control section changes the display state of the provisional subject image in the live view screen according to the distance to the actual subject specified by the subject distance specifying section and the change amount detected by the detecting section.

6. The imaging apparatus according to claim 5, wherein the detecting section has a distance measuring function for measuring a movement distance of the imaging apparatus in a lateral direction, and calculates the movement distance of the provisional subject image in the lateral direction in the live view screen according to the distance to the actual subject specified by the subject distance specifying section, a focal length of a lens, and the movement distance measured by the distance measuring function, and wherein the display control section changes a display position of the provisional subject image by moving the provisional subject image in the live view screen in the lateral direction for display according to the movement distance calculated by the detecting section.

7. The imaging apparatus according to claim 5, wherein the detecting section has a distance measuring function for measuring a movement distance of the imaging apparatus in a longitudinal direction, and calculates a movement magnification of the provisional subject image in the live view screen according to the distance to the actual subject specified by the subject distance specifying section, a focal length of a lens, and the movement distance measured by the distance measuring function, and wherein the display control section changes a display size of the provisional subject image in the live view screen according to the movement magnification calculated by the detecting section.

8. The imaging apparatus according to claim 5, wherein the detecting section has an angle measuring function for measuring an angle with reference to an optical axis of the imaging apparatus, and calculates a movement distance of the provisional subject image in a lateral direction in the live view screen according to the distance to the actual subject specified by the subject distance specifying section and the angle measured by the angle measuring function, and wherein the display control section changes a display position of the provisional subject image by moving the provisional subject image in the live view screen in the lateral direction for display according to the movement distance calculated by the detecting section.

9. The imaging apparatus according to claim 1, further comprising:

a magnification changing section which arbitrarily changes the photographing magnification, wherein the display control section changes a display size of the provisional subject image in the live view screen according to the photographing magnification changed by the magnification changing section.

10. The imaging apparatus according to claim 1, wherein the imaging section has a self-timer photographing function, and performs self-timer photographing as the provisional photographing.

11. The imaging apparatus according to claim 1, further comprising:

a generating section which generates the provisional subject image by cutting out the actual subject image from the photographed image obtained by the provisional photographing by the imaging section, wherein the composite display section displays the provisional subject image generated by the generating section on the live view screen by composite display.

12. The imaging apparatus according to claim 1, wherein the composite display section arranges, as the provisional subject image, a virtual human-shaped image prepared in advance on the position in the live view screen specified by the specifying section.

13. The imaging apparatus according to claim 1, wherein the composite display section performs transparent display of the provisional subject image on the live view screen.

14. The imaging apparatus according to claim 1, wherein the imaging section has a self-timer photographing function, and performs self-timer photographing as actual photographing after the provisional photographing.

15. The imaging apparatus according to claim 1, wherein the composite display section arranges the actual subject image at the position specified by the specifying section in the live view screen, in a state in which the photographing position, the photographing direction, and the photographing magnification have not changed in the live view screen since the provisional photographing was performed.

16. An imaging processing method for an imaging apparatus including an imaging section, said method comprising:

displaying, by composite display, a provisional subject image that is not present in an image from the imaging section such that the provisional subject image is arranged on a predetermined position in a live view screen where the image from the imaging section which images a subject is displayed as a live view image;

when at least one of a photographing position, a photographing direction, and a photographing magnification is changed in a state where the provisional subject image is displayed by the composite display, changing a display state of the provisional subject image in the live view screen according to a change amount of the at least one of the photographing position, the photographing direction, and the photographing magnification, in response to a change of the live view image; and specifying a position at which an actual subject image actually appears in a photographed image obtained by provisional photographing by the imaging section before the composite display;

wherein, as the provisional subject image that is not present in the image from the imaging section, an image corresponding to the actual subject image is arranged at the specified position in the live view screen; and wherein the display state of the provisional subject image in the live view screen is changed according to the change amount when at least one of the photographing position, the photographing direction, and the photographing magnification is changed, with reference to the photographing position, the photographing direction, and the photographing magnification at a time of the provisional photographing.

17. A non-transitory computer-readable storage medium having stored thereon a program that is executable by a computer of an imaging apparatus including an imaging section, the program being executable by the computer to perform functions comprising:

processing for displaying, by composite display, a provisional subject image that is not present in an image from the imaging section such that the provisional subject image is arranged on a predetermined position in a live view screen where the image from the imaging section which images a subject is displayed as a live view image;

processing for, when at least one of a photographing position, a photographing direction, and a photographing magnification is changed in a state where the provisional subject image is displayed by the composite display, changing a display state of the provisional subject image in the live view screen according to a change amount of the at least one of the photographing position, the photographing direction, and the photographing magnification, in response to a change of the live view image; and processing for specifying a position at which an actual subject image actually appears in a photographed image obtained by provisional photographing by the imaging section before the composite display;

wherein, as the provisional subject image that is not present in the image from the imaging section, an image corresponding to the actual subject image is arranged at the specified position in the live view screen; and wherein the display state of the provisional subject image in the live view screen is changed according to the change amount when at least one of the photographing position, the photographing direction, and the photographing magnification is changed, with reference to the photographing position, the photographing direction, and the photographing magnification at a time of the provisional photographing.

* * * * *